Dec. 23, 1958

C. GRENZ 2,865,434

HEAD REST

Filed April 16, 1957

INVENTOR.

Chris Grenz

Dec. 23, 1958

C. GRENZ 2,865,434

HEAD REST

Filed April 16, 1957

INVENTOR.

Chris Grenz

United States Patent Office 2,865,434
Patented Dec. 23, 1958

2,865,434

HEAD REST

Chris Grenz, Miles City, Mont.

Application April 16, 1957, Serial No. 653,141

1 Claim. (Cl. 155—177)

This invention relates to automotive vehicles and more particularly to a passenger head rest.

It is an object of the present invention to provide individual head rests for the driver and passengers of a vehicle for reducing fatigue and increasing comfort.

It is another object of the present invention to provide a head rest for automotive vehicles that is simple in construction, can be readily assembled and removed from the vehicle seat, and which can be adjusted to accommodate individuals of all sizes.

It is still a further object of the present invention to provide an adjustable head rest of the above type that may be selectively moved between an inoperative and an operative position, adjusted to suit any individual, and which may be used on substantially all types of vehicles.

Other objects of the invetnion are to provide an automotive head rest bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
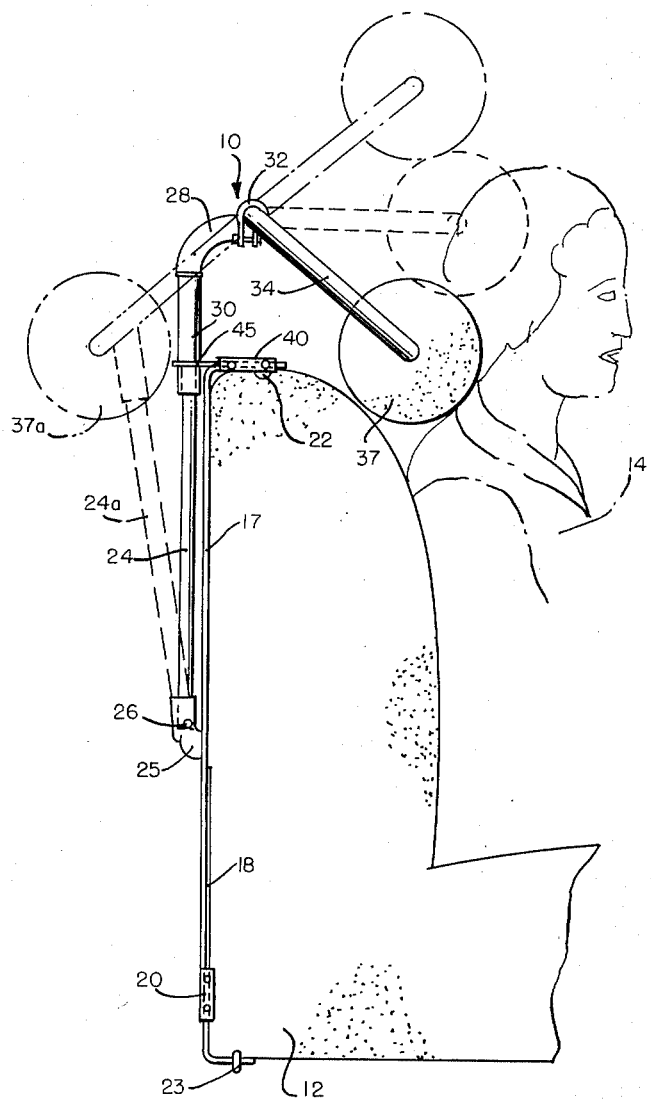
Figure 1 is a side elevational view of a head rest made in accordance with the present invention, shown in operative use upon the seat of a vehicle, in various selective positions.
Figure 4:
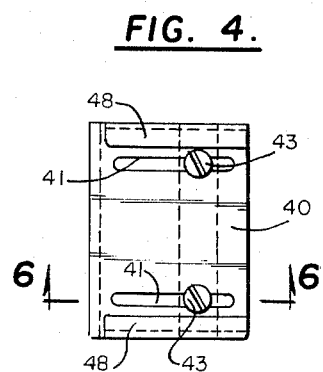
Figure 4 is an enlarged top elevational view of a bracket forming a part of the present invention.
Figure 5:
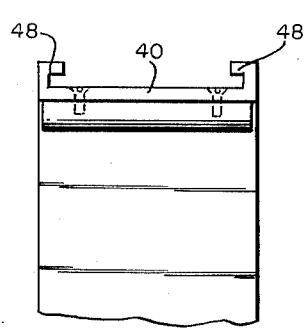
Figure 5 is a front elevational view of the bracket shown in Figure 4.
Figure 6:
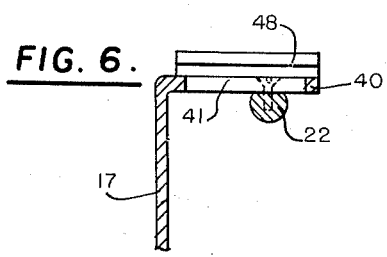
Figure 6 is a longitudinal cross sectional view taken along line 6—6 of Figure 4.

Referring now more in detail to the drawing, a head rest 10 made in accordance with the present invention is shown in operative association with an automobile seat 12, in which a driver or passenger 14 is seated. The head rest includes clamping means in the form of an upper angle bracket 17 and a lower angle bracket 18 that are telescopically related to each other and may be maintained in a selective adjusted position by means of a releasable slide collar clamp 20 that slidably receives the lower end of the angle bracket 17 to permit adjustment of the distance between the upper and lower ends of the assembly. The base of the upper angle bracket 17 is provided with a transversely extending lug 22, while the base of the lower bracket 18 is provided with a similar lug 23. These lugs grip the opposite upper and lower ends of the seat so as to prevent the accidental release of the angle brackets.

Figure 2:
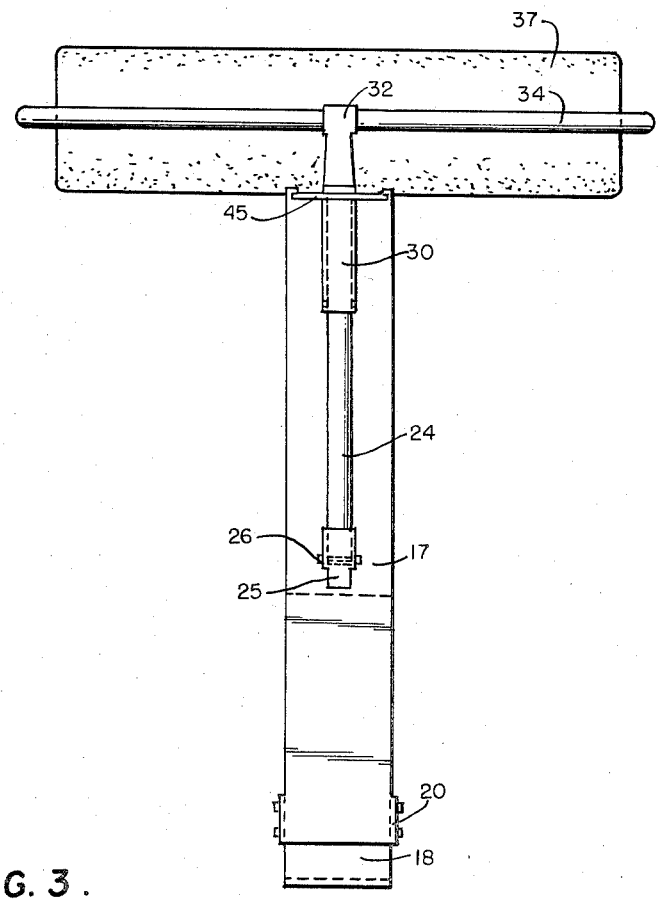
Figure 2 is a rear elevational view of the head rest shown in Figure 1.
Figure 3:
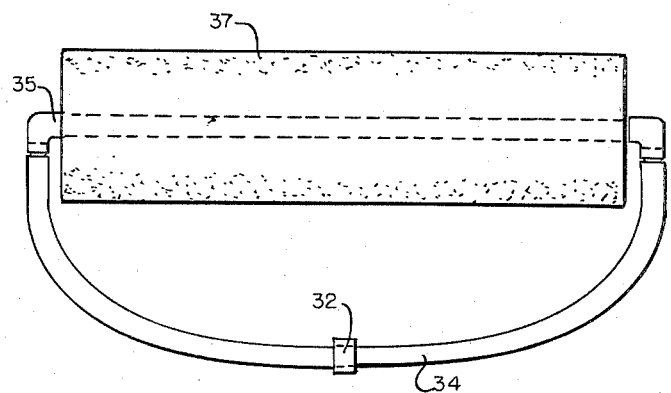
Figure 3 is a top plan view of the head rest shown in Figure 2.

A tubular support post 24 is pivoted at its lower end, by means of a pin 26 to a sleeve 25 that is pivotally mounted upon the upper angle bracket 17, as shown in Figure 2. The upper end of the post 24 is slidably received within the open end of a depending tubular shaft 30 that has a right angle bend 28. The free end of the bend 28 is provided with an adjustable clamp 32 which rotatably secures a bail 34 thereto. The free ends of the bail 34 are connected by a transversely extending rod 35 upon which a cylindrical element head rest 37 is rotatably supported.

The base of the upper angle bracket 17 is also provided with a guide plate 40 that has a pair of longitudinally extending slots 41 through which screws 43 extend for adjusting the position of the upper lug 22. A horizontal plate 45 secured to the depending tubular shaft 30 is slidably received between spaced parallel flanges 48 that function to guide the plate 45 for reciprocating longitudinal movement.

In use, the head rest is clamped to the seat 12 in the manner shown in Figure 1. Because of the cooperation of the various clamping elements and the brackets, the head rest cylinder 37 may be moved to substantially any desired vertical position by rotating the bail 34 about the clamp 32. When not in use, the head rest 37 may be rotated to the rearward position 37a, behind the seat. In view of the pivotal connection of the tubular support post 24 to the angle bracket 17, the post may also be moved rearwardly to an adjusted position 24a to provide a very high degree of adjustment to the head rest. Of course, the head rest cylinder 37 is preferably constructed of foam rubber and may readily be replaced by removing the rod 35 extending between the free ends of the bail 34.

While various changes may be made in the detail construction, it shall be understood that such changes shall be within the spirit and scope of the present invention as defined by the appended claim.

What I claim as new and desire to protect by Letters Patent of the United States is:

A head rest for use in automotive vehicles comprising, in combination, a tubular support post, clamping means for releasable engagement with the seat structure of the vehicle, pivotal means for rotatably securing said support post to said clamping means, and a head cushion carried by the uppermost extremity of said tubular support post, said clamping means comprising a pair of telescopically connected angle brackets for adjustably gripping the uppermost and lowermost extremities of said seat structure, said pivot means comprising a sleeve secured to one of said angle brackets and a pivot pin securing said post to said sleeve for rotation about a horizontal axis, said head cushion including a bail, adjustable clamp means rotatably securing said bail to said support post, a cylindrical head rest rotatably carried by said bail, a guide plate integral with said one bracket adjacent to said tubular support post, and a plate carried by said tubular post slidably received within said guide plate for reciprocating horizontal movement for adjusting the angular relationship between said tubular support post and said angle brackets.

References Cited in the file of this patent
UNITED STATES PATENTS

| | | |
|---|---|---|
| 2,490,088 | Penn | Dec. 6, 1949 |
| 2,666,476 | Lycan | Jan. 19, 1954 |
| 2,765,840 | Robert et al. | Oct. 9, 1956 |